Feb. 27, 1968   D. BROECKEL   3,370,728
CHAFF COLLECTOR ATTACHMENT FOR COMBINES
Filed May 10, 1965   2 Sheets-Sheet 1
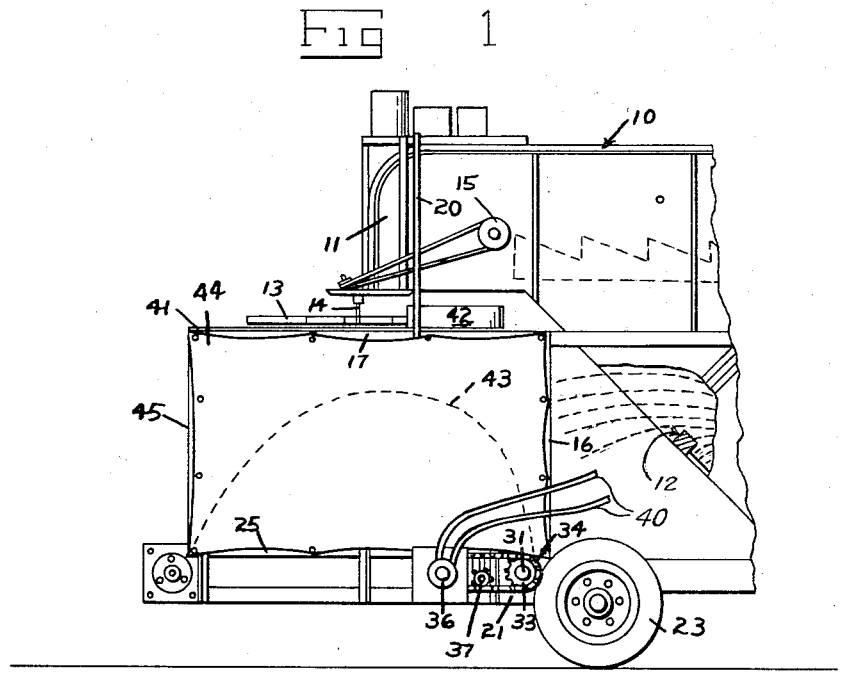
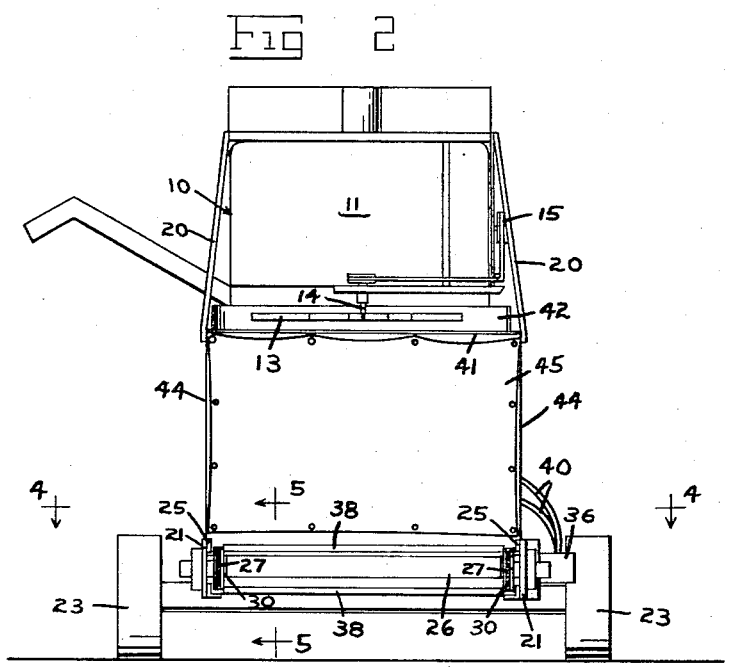
INVENTOR.
DANIEL BROECKEL
BY *Wells & St.John*
ATTYS.

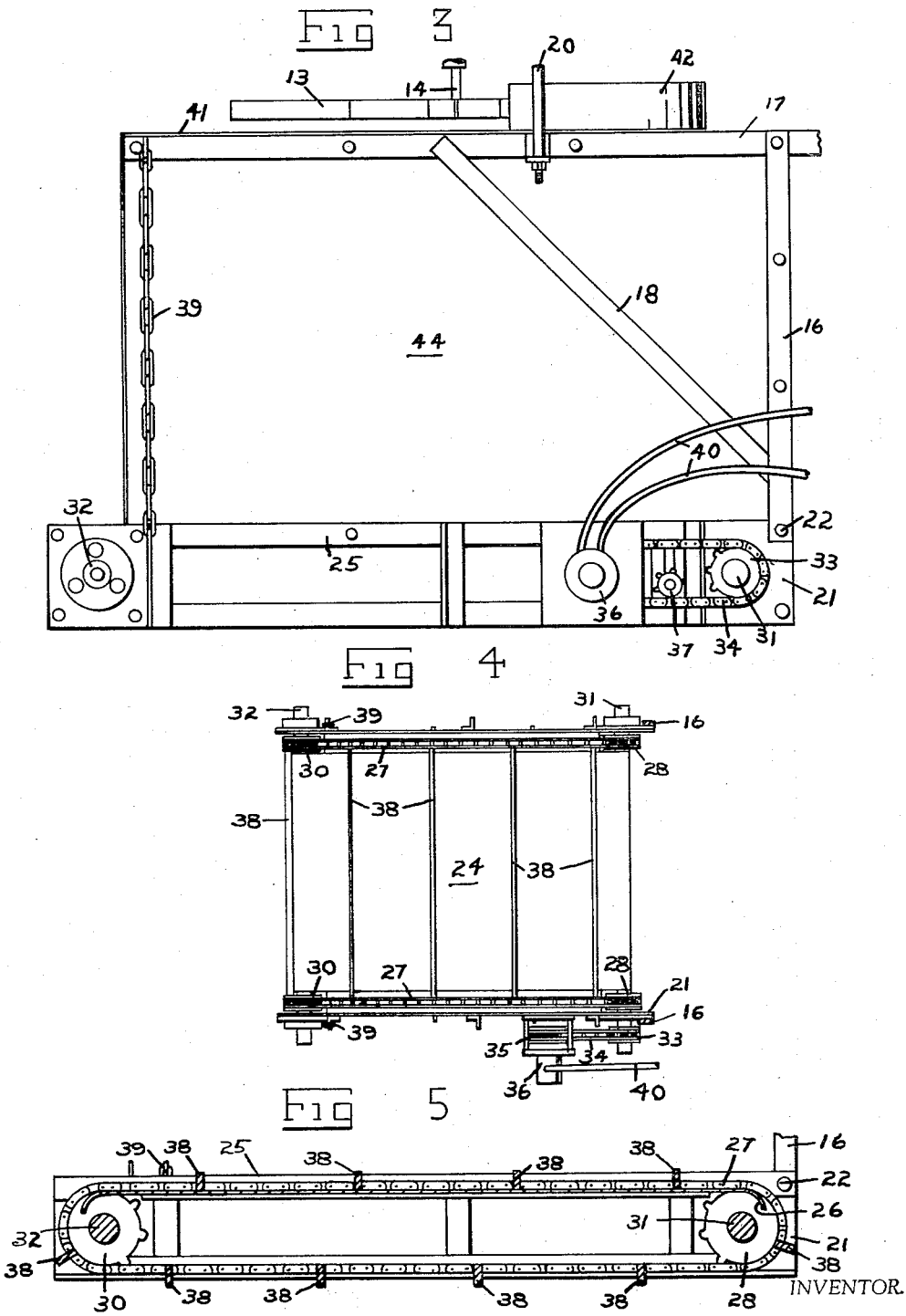

United States Patent Office 3,370,728
Patented Feb. 27, 1968

3,370,728
CHAFF COLLECTOR ATTACHMENT
FOR COMBINES
Daniel Broeckel, Rte. 1, Lacrosse, Wash. 99143
Filed May 10, 1965, Ser. No. 454,527
3 Claims. (Cl. 214—522)

This invention elates to a novel chaff collector attachment for combines to accumulate chaff ejected from the rear of the grain shoes and to provide for the unloading of the chaff in a heap on the ground where it can be used for feeding cattle, or for other recovery purposes.

The separator section of a combine, and particularly a self-propelled combine, utilizes straw walkers to carry coarse straw from the front of the separator section of the combine to the rear. It is there ejected downwardly and falls on rotating spreader blades that scatter the straw on the ground behind the machine. Beneath the straw walker, the grain shoes or sieves carry chaff and short straw rearwardly during the separation of grain. Air brown rearwardly over the shoes discharges the chaff and material over the back end wall of the combine below and in front of the straw spreader. In most machines today, this material is simply allowed to fall on the ground.

The chaff and material that is ejected from the rear of the grain shoes is quite suitable for feed, particularly because it contains a considerable amount of grain. The chaff itself is nutritious for animals.

The present invention provides a mechanically simple attachment for a combine to accumulate this chaff on the moving machine and unload in piles for future recovery or simply to leave it on the field for feeding animals.

It is a first object of this invention to provide a simple unit for attachment at the rear of a combine that will accumulate and selectively unload the chaff ejected from the separator mechanism and which will maintain this material separate from the straw, allowing the straw to be spread in the usual fashion.

Another object of this invention is to provide such a device at the rear of the combine which will not in any manner interfere with the normal operation of the basic machine. Particularly, the accumulator is designed to yield in an upward direction when in contact with the ground so that the extension of this unit rearward of the combine will not obstruct the maneuverability of the apparatus on hillsides or in valleys.

Another object of this invention is to provide such a device that can be completely controlled by the operator of the combine from his normal operating platform. The only moving mechanism in the device is powered by a hydraulic motor unit that is remotely controlled by the machine operator.

These and other objects will be evident from the following disclosure, taken together with the accompanying drawings, which illustrate a preferred form of the invention as actually mounted on a combine. It is to be understood that modifications can be made in the structure in order to meet the requirements of a particular machine, and that the exemplary disclosure given herein is not intended to limit or restrict the scope of my invention.

In the drawings:
FIGURE 1 is an elevation side view of the rear end of a combine equipped with the present attachment;
FIGURE 2 is a rear view of the apparatus shown in FIGURE 1;
FIGURE 3 is an enlarged elevation side view of the accumulator and unload attachment with the canvas side wall removed;
FIGURE 4 is a sectional view of the accumulator and the unloader as seen along line 4—4 in FIGURE 2; and
FIGURE 5 is an enlarged fragmentary sectional view through the lower part of the accumulator as seen along line 5—5 in FIGURE 2.

The present apparatus makes no modification in the basic structure of the combine on which it is mounted. It is attached to the rear of the combine as shown in FIGURES 1 and 2. The combine is designated generally by the numeral 10. Within the mobile framework of the combine 10 is a separator mechanism for separating straw and chaff from the desired grain. In such an apparatus, the straw walkers (shown in phantom) carry the separated straw to the top rear of the combine where it is discharged downwardly through the rear hood 11. The fine chaff and small bits of straw that are finally separated from the grain are ejected rearwardly through the opening 12 by moving air across the grain shoes or sieves. This chaff normally is blown over the rear wall of the combine through opening 12 and allowed to fall on the ground where it can actually serve no purpose other than its use as a natural mulch.

At the rear of the combine 10 is a straw spreader composed of a series of horizontal blades 13 mounted on a shaft 14 powered by a pulley 15. The blades 13 rotate continuously beneath the falling straw from the hood 11 to spread straw generally about the area rearward of the combine.

The attachment provided herein serves two purposes. It maintains the chaff and fine materials that are ejected through the opening 12 separate from the coarse straw that falls beneath the hood 11. The fine materials are accumulated on a moving platform carried with the moving framework 10 and discharged when and where desired.

The lower platform that receives and accumulates the chaff and desirable fine material, including some grain, can best be understood from the disclosure of FIGURES 3 to 5. It is suspended at the lower ends of upright braces 16 at each side of the combine 10. The braces 16 in turn are supported by upper horizontal members 17 and angular braces 18 as well as vertical rods 20, all of which are bolted in fixed positions relative to the framework of combine 10 and therefore form part of the combine framework at the rear of the machine. At the bottom end of each brace 16 the rigid frame 21 of the lower platform is pivotally carried by coaxial bolts 22. Thus, the frame 21 is free to pivot about a horizontal transverse axis at the rear of the machine. The axis of the bolts 22 is closely adjacent to the rear wheels 23 of the combine 10.

The frame 21 supports a shelf or fixed platform 24 that is rigidly secured to the inwardly turned flanges of side angle irons 25. The front and rear ends of the shelf 24 are curved downwardly as shown at 26.

A selectively movable conveyor extends across the upper face of the shelf 24 and comprises a pair of endless chains 27 located respectively at the opposite sides of frame 21. Each chain 27 is entrained at the front and rear ends of frame 21 over coaxial sprockets 28 or 30. The paired sprockets 28 are fixed to a shaft 31 and the paired sprockets 30 are fixed to a shaft 32. Shaft 31 is powered by an outside sprocket 33 through a short driving chain 34 and a driving sprocket 35 powered by a hydraulic motor 36. An idle sprocket 37 is provided with an adjustable mounting on the frame 21 to take up unnecessary slack in the driving chain 34.

Extending across the frame 21 and located directly across the upper face of shelf 24 along the upper flights of the chains 27 are transverse slats or bars 38. The slats 38 rest on the top surface of the shelf 24 and are longitudinally spaced from one another along the complete length of each chain 27. Since the two chains 27 are driven by coaxial identical sprockets fixed to common transverse shafts 31–32, the parallel relationship that exists between the slats 38 and their transverse positions shown in the drawings will always be maintained.

The purpose of pivotally carrying the frame 21 by bolts 22 is to permit the rear end of frame 21 to lift when necessary. It projects rearwardly beyond the normal length of the combine 10 and might otherwise be damaged when the combine 10 levels off at the bottom of a hill or gulley. The rear end of the frame 21 is free to pivot upwardly and the normal horizontal position of the frame 21 is located by flexible chains 39 at each side of the apparatus extending from the members 17 downward to a connection at the rear end of frame 21.

The motor 36 is connected by means of hydraulic hoses 40 to the conventional hydraulic system on the combine 10 and can be selectively operated by conventional controls (not shown) at the usual operator's platform.

In order to prevent straw from falling beneath the hood 11 onto the self 24, a second platform or ledge is provided across the upper horizontal members 17. This platform is simply a solid plate 41 which carries a curved forward plate 42 to prevent the straw from being thrown forward toward the rear of the combine 10. The plates 41–42 do not otherwise inhibit the normal action of the blades 13 that will continue to spread the straw, and serve to prevent the flying straw spread by the blades 13 from falling onto the shelf 24.

As illustrated in FIGURES 1 and 2, in order to accumulate chaff in a pile as illustrated by the dashed lines at 43, it is preferable to use flexible side walls 44 made of fabric such as canvas attached along its edges to the frame 21, the upright braces 16 and as the horizontal members 17 at each side of the apparatus. At the rear of the apparatus another flexible wall or sheet of canvas 45 is provided and is suspended only along its upper edge across the plate 41. The lower edge of the sheet of canvas 45 can be weighted in order to prevent it from flapping in the wind unnecessarily. It usually will not be secured at the bottom, since this would require manual releasing of this sheet in order to eject material out the rear of the apparatus.

The operation of this attachment does not in any manner interfere with the usual operation of the combine. Even its projection adjacent to the ground and rearward of the combine does not interfere with the maneuverability of the machine, since the rear of the frame 21 is free to pivot upwardly when necessary. Ordinarily, the frame 21 will remain in its horizontal position and will receive chaff and material from the rear of the combine as it is blown over the back wall at the area designated in FIGURE 1 by the numeral 12. The straw falling from the hood 11 will be spread by the blades 13 in the usual fashion. The chaff and other material blown through opening 12 will accumulate on the shelf 24. It can then be unloaded periodically by operating the motor 36 and causing the slats 38 in the upper flight of the movable conveyor to move to the rear. This will empty the chaff and material accumulated on shelf 24 and allow it to fall off the rear end of shelf 24. This material can then be recovered or allowed to remain on the ground as economical feed for cattle or other animals.

The apparatus as shown in the drawings is generally applicable to modern combines, but minor modification might be required in certain instances. Therefore the specific details of this embodiment of my invention are not intended to limit the scope of the invention, which is set out in the claims which follow.

Having thus described my invention, I claim:

1. A chaff collector attachment mounted to the rear of a grain combine for receiving, collecting and selectively unloading chaff blown rearward through the chaff opening in the combine and for deflecting straw discharged downwardly from a straw opening located above and rearward of the chaff opening, comprising:
   (a) a deflector plate mounted to the combine above the chaff opening and in the path of the straw for deflecting the straw rearwardly;
   (b) a platform pivotally mounted across the rear of the combine below the chaff opening of the combine for receiving the chaff;
   (c) side and rear fabric walls attached to the deflector plate and extending downwardly to the platform enabling the platform to accumulate chaff;
   (d) a flexible connector extending between the combine and the platform to limit the downward swing of the platform to a normally horizontal position;
   (e) a conveyor system mounted on the platform for selectively unloading accumulated chaff, said conveyor system having:
      (1) a pair of spaced parallel continuous chains movably mounted to the platform with the lower flight of the chains passing above the platform and the lower flight of chains passing below the platform;
      (2) a plurality of spaced transverse slats mounted between the chains; and
      (3) a drive means connected to the chains for selectively moving the chains to move the slats over the platform to unload the accumulated chaff.

2. A chaff collector attachment mounted to a grain combine for receiving, collecting, and selectively unloading chaff blown from the rear of the combine, said attachment comprising:
   (a) a horizontal platform pivotally mounted transverse to the combine below the chaff discharge of the combine for receiving and supporting chaff and enabling the rear of the platform to swing upward in relation to the front of the platform;
   (b) side and rear walls extending substantially upwardly from the platform for enabling the platform to accumulate the chaff blown from the rear of the combine;
   (c) an endless conveyor having transverse slats movable over the platform;
   (d) a selectively operated drive means for moving the conveyor to unload the accumulated chaff from the chaff collector, and
   (e) motion limting means for limiting the downward pivotal movement of the rear of the platform.

3. A chaff collector attachment mounted to a grain combine for receiving, collecting and selectively unloading chaff blown through the chaff opening in the rear of the combine and for deflecting straw emitted downwardly from the straw opening located above and rearward of the chaff opening; comprising:
   (a) a platform pivotally mounted across the rear of the combine and below the chaff opening to enable the tail end of the platform to swing upwardly in relation to the front of the platform;
   (b) a flexible connecting means between the combine and the platform for limiting the downward swing of the rear of the platform to a normal horizontal orientation;
   (c) side and rear walls extending upwardly from the platform for enabling the platform to accumulate the chaff blown from the combine;
   (d) a deflector plate mounted across the rear of the combine elevated from the platform and the chaff opening and in the path of the emitted straw for preventing the straw from falling on the platform; and
   (e) a conveyor system mounted to the platform for selectively unloading the accumulated chaff.

(References on following page)

References Cited

UNITED STATES PATENTS

| | | | |
|---|---|---|---|
| 641,022 | 1/1900 | Landis | 302—6 |
| 1,480,548 | 1/1924 | Dore | 130—21 |
| 2,230,195 | 1/1941 | Warren. | |
| 2,419,824 | 4/1947 | Davis | 214—522 X |
| 2,617,425 | 11/1952 | Dion | 130—24 |
| 2,649,760 | 8/1953 | Gustafson | 209—77 X |
| 2,805,784 | 8/1957 | Dokken | 214—83.36 |
| 2,810,605 | 10/1957 | Anderson | 298—27 |

FOREIGN PATENTS 244    1/1926    Australia.

GERALD M. FORLENZA, *Primary Examiner.*

ALBERT J. MAKAY, *Examiner.*